(12) United States Patent
Webb

(10) Patent No.: US 10,012,105 B2
(45) Date of Patent: Jul. 3, 2018

(54) BLADE ARRANGEMENT OF A JET ENGINE OR AN AIRCRAFT PROPELLER

(71) Applicant: Rolls-Royce Deutschland Ltd & Co KG, Blankenfelde-Mahlow (DE)

(72) Inventor: Simon Paul Webb, Berlin (DE)

(73) Assignee: ROLLS-ROYCE DEUTSCHLAND LTD & CO KG, Blankenfelde-Mahlow (DE)

(*) Notice: Subject to any disclaimer, the term of this patent is extended or adjusted under 35 U.S.C. 154(b) by 219 days.

(21) Appl. No.: 14/969,769

(22) Filed: Dec. 15, 2015

(65) Prior Publication Data

US 2016/0177780 A1     Jun. 23, 2016

(30) Foreign Application Priority Data

Dec. 17, 2014   (EP) .................................... 14198657

(51) Int. Cl.
| | | |
|---|---|---|
| *F01D 5/14* | (2006.01) | |
| *F01D 21/04* | (2006.01) | |

(Continued)

(52) U.S. Cl.
CPC ............ *F01D 21/045* (2013.01); *B64C 11/20* (2013.01); *B64C 11/205* (2013.01); *F01D 5/147* (2013.01);
(Continued)

(58) Field of Classification Search
CPC ....... F01D 5/147; F01D 21/045; B64C 11/20; B64C 11/205; F02K 3/04; F05D 2220/323; F05D 2220/36; F05D 2260/30; F05D 2300/601; F05D 2300/6012; Y02T 50/672; Y02T 50/673
See application file for complete search history.

(56) References Cited

U.S. PATENT DOCUMENTS

| | | | |
|---|---|---|---|
| 2,920,868 A | | 1/1960 | Ackerman et al. |
| 4,810,167 A | * | 3/1989 | Spoltman ........... B29D 99/0025 416/229 A |

(Continued)

FOREIGN PATENT DOCUMENTS

| | | |
|---|---|---|
| GB | 2166202 A | 4/1986 |
| WO | WO9214646 A1 | 9/1992 |
| WO | WO2013165865 A1 | 11/2013 |

OTHER PUBLICATIONS

European Search Report dated Jun. 2, 2015 from counterpart European App No. 14198657.0.

*Primary Examiner* — Igor Kershteyn
(74) *Attorney, Agent, or Firm* — Shuttleworth & Ingersoll, PLC; Timothy J. Klima

(57) ABSTRACT

A blade arrangement of a jet engine or an aircraft propeller including a blade with a root portion and an aerofoil portion, wherein the aerofoil portion includes a suction side and a pressure side. The blade arrangement further includes a retention structure that is configured to radially retain the blade in case of a structural blade failure, wherein the retention structure is secured to the root portion and/or to a structure adjacent to the root portion and extends in the radial direction along the suction side and along the pressure side of the aerofoil portion. The retention structure forms a loop that runs at least around the root portion, along the suction side and along the pressure side of the blade.

20 Claims, 6 Drawing Sheets

(51) Int. Cl.
  *B64C 11/20* (2006.01)
  *F02K 3/04* (2006.01)
(52) U.S. Cl.
  CPC .......... *F02K 3/04* (2013.01); *F05D 2220/323* (2013.01); *F05D 2220/36* (2013.01); *F05D 2260/30* (2013.01); *F05D 2300/601* (2013.01); *F05D 2300/6012* (2013.01); *Y02T 50/672* (2013.01); *Y02T 50/673* (2013.01)

(56) References Cited

U.S. PATENT DOCUMENTS

| | | | |
|---|---|---|---|
| 4,966,527 A | 10/1990 | Merz | |
| 5,240,377 A * | 8/1993 | Farr | B29C 70/083 416/224 |
| 5,282,720 A | 2/1994 | Szpunar | |
| 5,308,228 A * | 5/1994 | Benoit | B29C 70/543 156/93 |
| 5,340,280 A * | 8/1994 | Schilling | F01D 5/282 416/219 R |
| 5,409,353 A * | 4/1995 | Imbault | F01D 5/286 416/212 A |
| 5,924,649 A * | 7/1999 | Piening | B64C 1/26 244/123.1 |
| 6,056,838 A * | 5/2000 | Besse | B29C 70/48 156/245 |
| 6,155,784 A * | 12/2000 | Carter, Jr. | B64C 11/06 416/134 A |
| 6,176,681 B1 * | 1/2001 | Stromberg | F04D 29/023 416/226 |
| 6,676,080 B2 * | 1/2004 | Violette | B64C 11/04 244/123.1 |
| 2009/0196756 A1 | 8/2009 | Althoff | |
| 2013/0058775 A1 | 3/2013 | Simms | |
| 2013/0164142 A1 | 6/2013 | Tutaj et al. | |

* cited by examiner

BLADE ARRANGEMENT OF A JET ENGINE OR AN AIRCRAFT PROPELLER

CROSS-REFERENCE TO RELATED APPLICATION

This application claims priority to European Patent Application EP 14 198 657.0 filed Dec. 17, 2014, the entirety of which is incorporated by reference herein.

BACKGROUND

The invention regards a blade arrangement of a jet engine or an aircraft propeller. Embodiments of such blade arrangement include a fan blade arrangement and a propeller blade arrangement.

Jet engines and aircraft propellers need to be able to deal with the situation of a blade off event. A blade off represents a situation in which a structural failure of load bearing material of a blade occurs such that the blade brakes off and fragments of the blade separate, which can cause serious damage to the jet engine and the aircraft.

In the case of a fan blade, in order to be able to withstand the impact loads of a fan blade off, it is known to construct the fan containment case in a strong and stiff manner and to provide deflections at the front and rear flanges of the fan case. However, such construction significantly drives complexity, weight and costs of a fan case. Further, post fan blade off, there is a significant out of balance of the fan rotor, which requires multiple "fuses" to be designed into the power transmission system to allow the fan rotor to spin concentric to its new center of mass. Such design further adds complexity, costs and weight to the system. Still further, in order to deal with out of balance loads after a fan blade off event, also the rest of the engine structure needs to be strengthened and stiffened and such strengthening and stiffening requirements may extend into the nacelle, pylon and the aircraft itself. Again, complexity, weight and costs of the engine structure are increased.

Similar or related problems occur if a compressor blade, a turbine blade or a propeller blade break.

SUMMARY

The present invention seeks to alleviate problems associated with a blade breakage.

The present invention provides a blade arrangement of a jet engine or an aircraft propeller with features as described herein and a jet engine with features as described herein.

According to the invention, there is provided a retention structure that is configured to radially retain the blade in case of a structural blade failure. The retention structure is secured to the root portion of the blade and/or to a structure adjacent to the root portion of the blade and extends in the radial direction along the suction side and along the pressure side of the aerofoil portion of the blade.

In that a retention structure is secured at or near the blade root and extends in the radial direction both along the suction side and along the pressure side of the aerofoil portion, the retention structure is able to radially hold and retain the fan blade on the rotor to which the fan blade is connected after structural failure of the usual load bearing material.

The present invention is thus based on the idea to avoid the problems associated with blade breakage by radially retaining the broken parts of the blade even after a structural blade failure, and to provide to this end a retention structure that hinders the broken parts of the blade to separate.

The invention provides for a new paradigm in dealing with a failed fan blade. The invention stops, rather than accounts for, the blade coming off the rotor. The present invention thus deals with the failure of a blade at the source on the rotor itself rather than dealing with the consequences of a failed fan blade in the rest of the engine. By stopping fragments of the blade coming off the rotor even after a blade breakage, the invention—in case of a fan blade—significantly reduces the weight and cost of the fan containment case. It further dramatically reduces the out of balance loads acting on the fan rotor after a fan blade off event. Thereby, weight, complexity and costs can also be reduced in many other parts of the engine. The reduction in weight and the reduction in out of balance loads that are present after a blade breaking event further allow for significant weight and cost reductions in the engine nacelle, pylon and airframe structure.

The invention also reduces the risk of high energy forward debris release and the risk to pilotability and an associated mitigating action such as reducing altitude or forward speed following a blade breaking.

Generally, the retention structure is a high-tensile structure that allows to radially retain a blade after the breaking of a blade.

It is pointed out that the present invention is applicable both to blades which are formed of a single metallic material such as Titanium and to blades which are formed of composite material such as Titanium, Carbon fibre and epoxy resin. It is further pointed out that the invention applies both to blades which are solid and to blades that comprise hollow areas.

As mentioned, the retention structure may be secured to the root portion or to a structure adjacent to the root portion. Such structure adjacent to the root portion to which the retention structure may be secured may be a disk such as a fan disk or another structure to which the blade is connected or part of. For example, the retention structure may be retained by an inner disc bore in which the blade is inserted.

To secure the retention structure to the root portion, the retention structure forms a loop that runs at least around the root portion, along the suction side and along the pressure side of the blade. This manner, there is provided an easy and highly reliable connection of the retention structure to the root portion. The loop that the retention structure forms may be a partial loop or a full loop. In case of a partial loop, the retention structure is U-shaped with the open end of the U-shape at or close to the tip of the blade. In case of a full loop, the retention structure runs around the root portion, along the suction side, along the pressure side and around the tip of the blade. Further, the retention structure may be pinched at the fixing of the blade root such as a dovetail fixing.

When the retention structure forms a full loop, there are several options of how the retention structure runs around the tip of the blade. In one embodiment, the retention structure may be looped over the tip of the blade. In another embodiment, the retention structure may run through an opening that is formed in the tip portion of the blade. Such opening could be in the form of a hole or a slit. Such embodiment has the advantage that there is no risk of the retention structure being damaged during operation of the blade.

In a further embodiment, the retention structure is formed by two retention elements, one element extending radially at the pressure side and one element extending radially at the suction side of the blade, wherein each of the elements is secured to the root portion of the blade. In such embodiment, it is important that the retention elements are firmly attached to the root portion in a reliable manner. To this end, there may be provided fastening means such as pins or hooks that attach the retention structure to the root portion. However, an attachment of the retention structure to the root portion with fastening means can also be provided for in case that the retention structure forms a loop under the root portion in order to further improve the connection between the retention structure and the root portion.

Generally, a blade may be attached with its root portion to a connecting structure such as disc (e.g., a fan disc or a compressor disc). To this end, the root portion may comprise an axial fixing such as a dovetail fixing. However, the disc and the blades may alternatively be formed in one piece, wherein a blisc (bladed disc) or bling (bladed ring) design may be chosen.

The retention structure is a textile, in particular a woven fabric. The retention structure is thus generally flat. The textile may be in the form of one or several bands or ribbons. If the retention structure is formed by a textile such as a band, and if the retention structure forms a full loop, such textile or band may be looped several times in the radial direction around the blade.

In one embodiment, the retention structure is in the form of one textile band that may be tapered in the radial direction towards the tip portion of the blade. For example, the axial extension of the band in the root portion may be in the range of the axial extension of the root portion itself, such that there is a firm connection of the textile band to the root portion. The band tapers from the root portion to the tip of the blade.

In a further embodiment, the retention structure is made out of a material that is lower in weight than the material of which the aerofoil section of the blade is made. For example, the retention structure is made out of Kevlar, whereby the blade is made of Titanium or of a composite material such as Titanium and Carbon fibre. As mentioned before, the blade may be solid or hollow.

In an embodiment, the retention structure is firmly connected to the blade aerofoil portion along its complete length. The blade and the retention structure together form a smooth aerodynamic external surface and profile.

In a further embodiment, the aerofoil section comprises on both the suction side and the pressure side at least one groove or valley, whereby the retention element is arranged in and glued to the at least one groove or valley. Accordingly, the retention structure has been formed separately from the aerofoil section and is attached to the aerofoil section after manufacturing of the aerofoil section. For example, a high-tensile strength band may be applied to a metallic blade (hollow or solid) after the metallic manufacturing process in a pre-machined groove or valley, wherein an adhesive is applied to join the band in the groove or valley and to provide a smooth aerodynamic external profile.

In a further embodiment, the retention structure is formed integrally with the blade. Such embodiment may be implemented in particular in case of a composite blade. In case of a composite blade, a high-tensile strength band may be built into the progressive composite lay-up of the blade and be co-cured. Reinforcing through thickness-pinning or other fastening means could be applied to increase the retention strength if required. However, also in case of a composite blade, the retention structure could be applied after curing similar as with a metallic blade.

In another embodiment, a high-tensile strength band or other textile may simply be applied on the pressure side and on the suction side of the blade after the metallic manufacturing process, wherein the initial profile leaves space for the retention structure and epoxy to be applied to provide for the final blade shape.

In a further embodiment of the invention, the retention structure is pretensioned in the radial direction. For example, if the retention structure is in the form of a fabric such as a band, such band could be pretensioned when applying it to the blade. By applying pretension, the retention structure limits the radial movement of the blade following fracture. Such pretension also allows the retention structure to take part of the centrifugal load that the blade is subjected to during rotation. Accordingly, a pretensioned retention structure takes some of the steady state loading on the blade. This allows the load bearing material of the blade to be optimized in weight.

By use of a pretensioned retention structure, there may also be provided for a damping of the blades, thereby improving the vibration characteristics of the blade. In particular, the contact surface between the normal load bearing material of the blade and the high-tensile retention structure may provide an opportunity—potentially in combination with another material—to design in damping in the blade when subjected to vibration. A thus reduced vibration load allows the blade to be further weight-optimized. Such weight optimization may take the form of thinning of sections of the blade or of a less dense material being used partly or wholly in the blade. For example, a thinning of sections may be provided by an increased hollowness of a hollow blade. A less dense material may be provided by using, e.g., Aluminum instead of Titanium or by using glass fibre rather than carbon fibre.

According to an embodiment of the invention, the inventive blade arrangement is a jet engine fan blade arrangement or a jet engine propeller blade arrangement. In further embodiments, the inventive blade arrangement may be a large compressor blade such as the blade of a booster. In all applications, the inventive blade arrangement improves integrity, allows weight optimization and reduces the out of balance loads after a blade breaking.

The invention further provides for a jet engine which comprises a blade arrangement with features as described herein.

BRIEF DESCRIPTION OF THE DRAWINGS

Further advantages and embodiments of the invention are described with reference to the drawings.

DETAILED DESCRIPTION

The invention will be described in the following by way of example primarily with respect to a fan blade of a fan of a dual-flow jet engine. However, the principles of the present invention apply similarly to blades of other components of a jet engine such as the blades of a compressor and to blades of a propeller.

Figure 4:
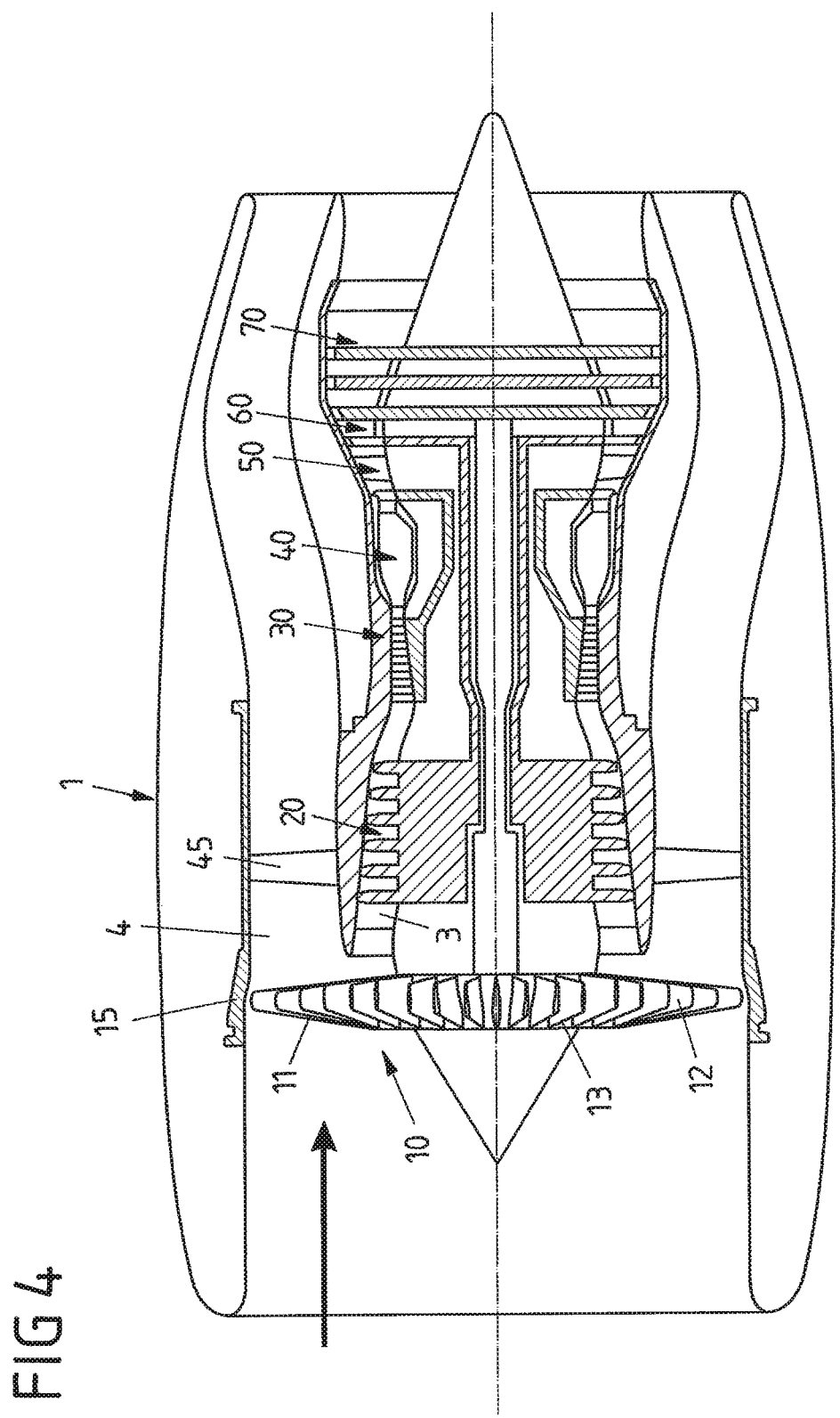
FIG. 4 shows a schematic sectional view of a gas turbine engine.

FIG. 4 is a schematic sectional view of a dual-flow jet engine 1. The jet engine 1 comprises a fan stage 10 with a fan as a low-pressure compressor, an intermediate-pressure compressor 20, a high-pressure compressor 30, a combustion chamber 40, a high-pressure turbine 50, an intermediate-pressure turbine 60 and a low-pressure turbine 70. The intermediate-pressure compressor 20 and the high-pressure compressor 30 each include a plurality of compressor stages, each compressor stage having a rotor stage and a stator stage. In one alternative, the jet engine 1 may include an additional low-pressure compressor in the core engine before the intermediate-pressure compressor 20.

The fan stage 10 comprises a fan 11 with fan blades 12 which are attached to a fan disc 13. The fan stage 10 further comprises a fan containment casing 15.

In a conventional manner, the dual-flow jet engine forms a secondary flow duct or bypass duct 4 and a primary flow duct or core duct 3. Air is accelerated by the fan 11 to produce two airflows, a first airflow flowing into the primary flow duct 3 and a second airflow which passes through the bypass duct 4 to provide propulsive thrust. In the bypass duct 4, a guide vane 45 and/or struts are arranged. The high-pressure, intermediate-pressure and low-pressure turbines 50, 60, 70, respectively, drive the high-pressure and intermediate-pressure compressors 30, 20 and the fan 11 by suitable interconnecting high-pressure, intermediate-pressure and low-pressure shafts, as is well-known to the person skilled in the art.

In the context of the present invention, there is provided a particular construction of the fan blades 12, as will be described with respect to FIGS. 1 to 3.

Figure 1:
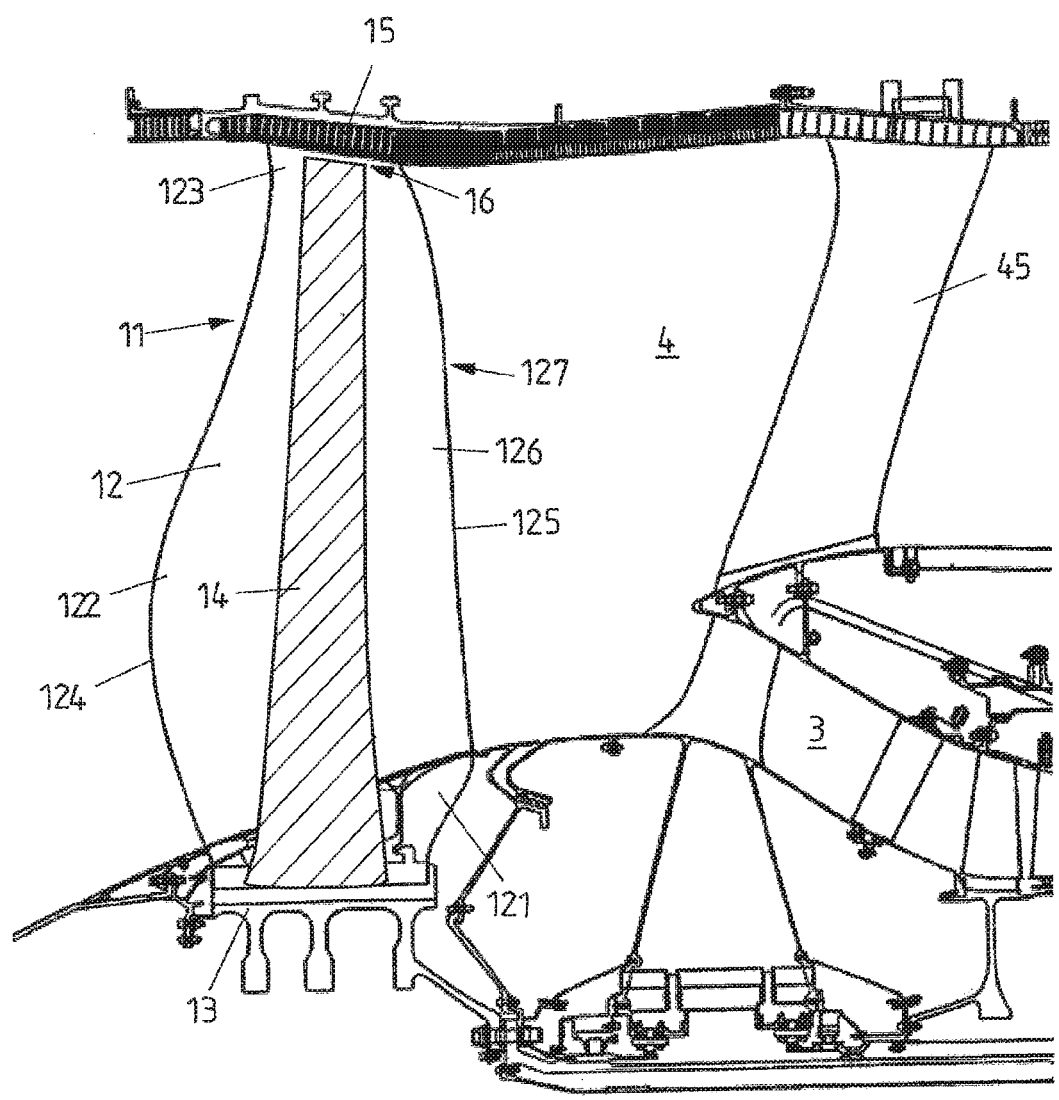
FIG. 1 is a partially sectional view of an embodiment of a fan stage of a jet engine, wherein the fan stage includes a fan with blades that comprise a retention structure.

FIG. 1 is a partial sectional view of an embodiment of the invention, wherein FIG. 1 depicts a fan 11 and the initial sections of a bypass duct 4 and a core duct 3. The fan 11 comprises a plurality of fan blades 12 which are each connected to a fan disc 13. The connection of the fan blades 12 to the fan disc 13 may be in a conventional manner, i.e. by means of dovetail fixings. The fan blades 12 by themselves or together with the fan disc 13 are also referred to as a blade arrangement.

Each blade 12 comprises a root portion 121, an aerofoil portion 122, a tip portion 123, a leading edge 124, a trailing edge 125, a suction side 126 and a pressure side 127.

According to the invention, the blade 12 further comprises a retention structure 14 that is formed by a high-tensile band. The high-tensile band may be a textile such as a high-tensile woven fabric. The high-tensile band 14 forms a loop that runs around the root portion 121, along the suction side 126, along the pressure side 127 and around the tip 123 of the blade. To run around the tip 123 of the blade, the tip portion 123 in one embodiment comprises an opening in the form of a slit 16. Alternatively, the high-tensile band may loop over the tip 123 of the blade 12. Generally, the high-tensile band 14 tapers in the radial direction towards the tip portion 123, as can be seen in FIG. 1.

To connect to the root portion 121 of the blade 12, in one embodiment, the high-tensile band 14 runs up around the aerofoil portion 122 and down around the root portion 121. This is shown in the sectional view of FIG. 2. As is shown in FIG. 2, the high-tensile band 14 completely loops around the root portion 121, which in the shown embodiment is in the form of an inner dovetail root fixing.

Such embodiment has a plurality of advantages. First, as the high-tensile band loops around the root portion 121, there is a reliable connection of the retention band 14 to the blade. Second, by looping around the inner dovetail root fixing of the blade, the material normally holding the blade in place is now used to retain it after fracture of the usual load bearing material. Third, during high speed rotation just after a fan blade off event, a high load that will act on the dovetail contact flanks 121a and thus press the band 14 between these flanks 121a and the respective surface of the fan disc will additionally help to retain the fractured aerofoil in place. In this respect, there may be provided load spreader sheets 130 next to the flanks 121a to protect the high tension band 14 at the root contact position from friction and abrasion. The load spreader sheets 130 may be formed, e.g., of a soft metallic material or a hard plastic material. The load spreader sheets 130 also allow for easy service replacement.

Figure 2:
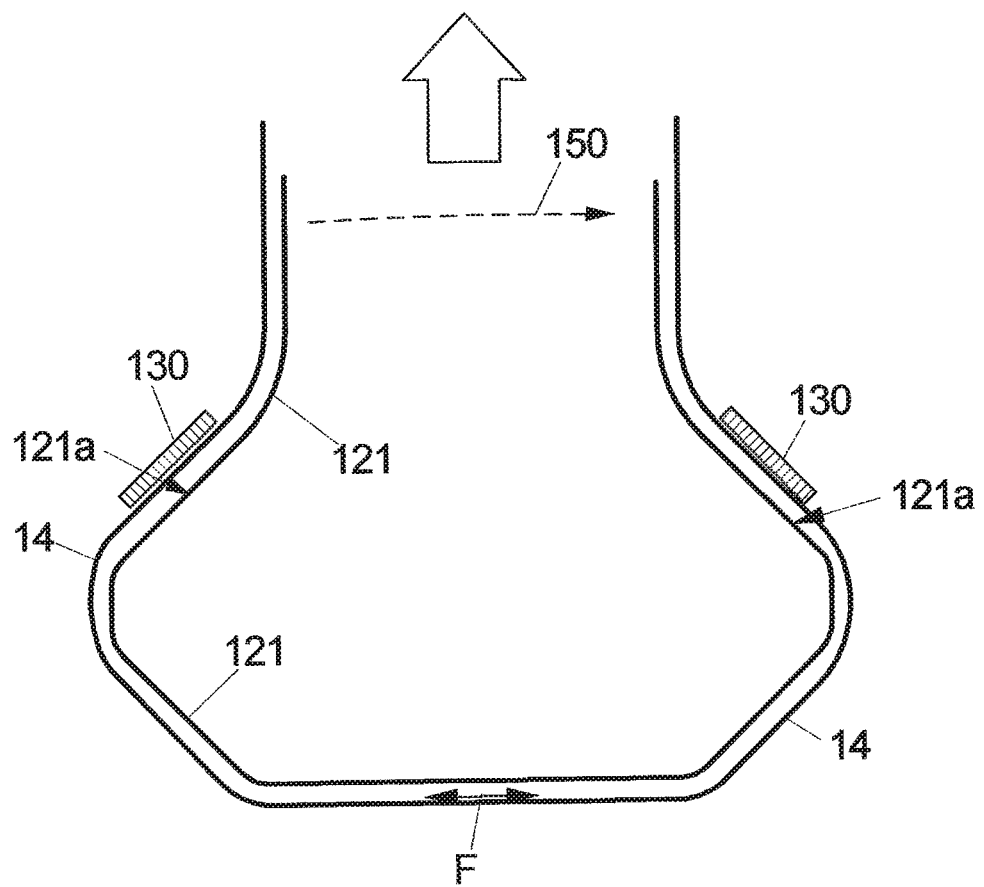
FIG. 2 is a schematic sectional view of the root portion of a fan blade of FIG. 1, wherein the root portion comprises an inner dovetail root fixing with a retention structure looped around.
Figure 3:
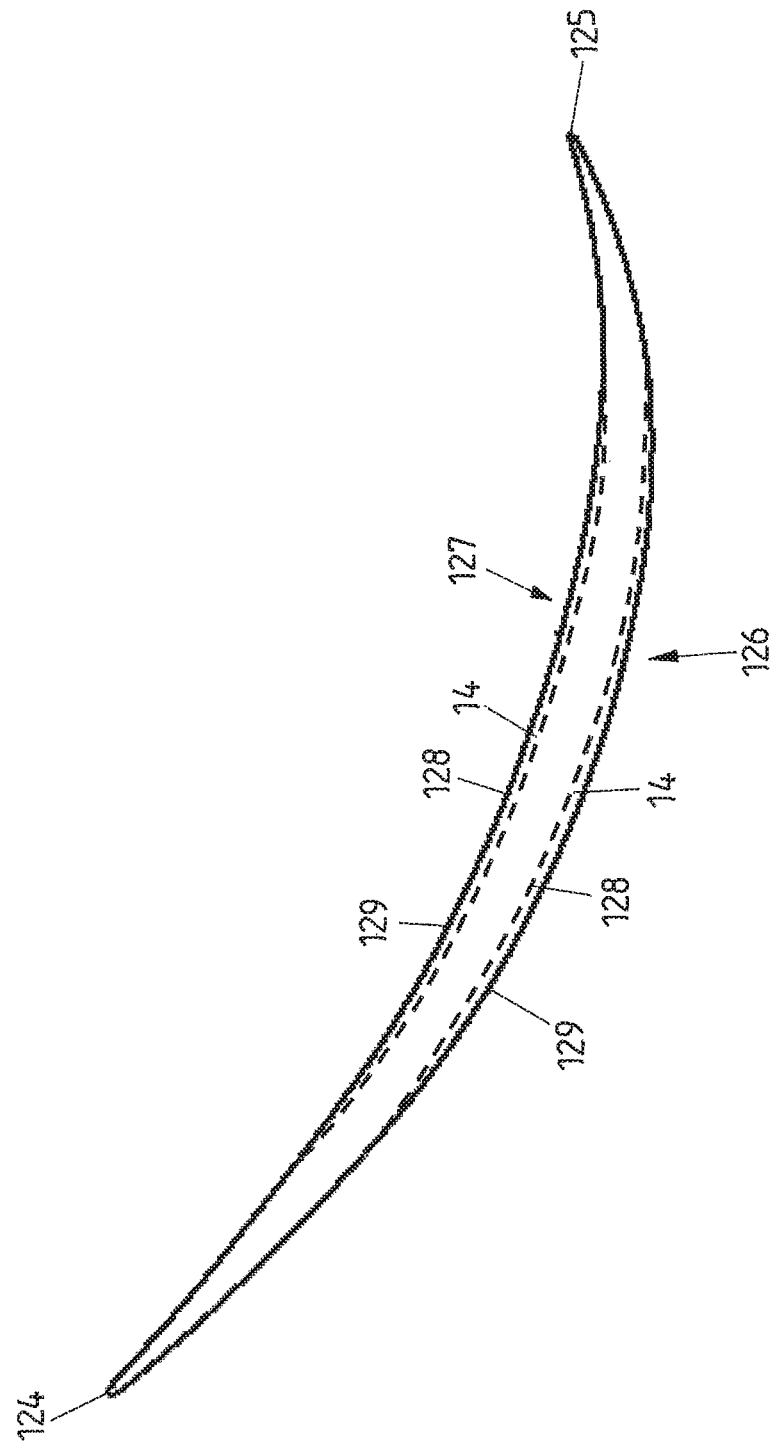
FIG. 3 is a cross-sectional view of an embodiment of a blade that comprises a retention structure at the section side and at the pressure side of the blade.

FIG. 2 further shows one potential fracture path 150 in case of a blade fracture. In case of such fracture, a high tension force F is exerted on the retention band 14 following a fan blade off event.

In the aerofoil portion 122 of the blade, the retention band 14 extends radially both along the suction side 127 and along the pressure side 126. If a blade is metallic, the band 14 may be applied after the metallic manufacturing process in a pre-machined valley or groove together with an adhesive, wherein a smooth aerodynamic external profile of the blade 12 is provided for. In case of a composite blade, the band 14 could be built into the progressive composite lay-up of the blade and be co-cured with the other layers of the blade. In case of a composite blade, alternatively, the band 14 could also be applied after curing as with a metallic blade.

Also, in case of a composite blade, a groove or valley may be formed in the outside surface of the blade by precision forging. Alternatively, a groove or valley may be machined into the blade after manufacturing.

Further, the blade 12 may be formed such that only after application of the band 14 the final blade shape is achieved. This is shown by way of example in FIG. 3. FIG. 3 shows a sectional view of a blade, wherein the dotted line 128 indicates the initial blade profile before application of the band 14. The initial blade profile thus leaves space for the band material on each side 126, 127 of the blade. Only after the band material together with adhesive has been filled in the spaces provided for, the final blade shape 129 is achieved. Accordingly, in the embodiment of FIG. 3, the aerofoil is formed such that only after addition of the retention structure and glue the blade receives its final blade shape.

Accordingly, in case of a fan blade off event, the high-tensile strength band 14 looped in the radial direction around the fan blade 12 will retain the aerofoil in space even at high rotational speeds. In the embodiment shown in FIGS. 1 and 2, such retaining of the fan blade after breakage is further supported by the root portion 121 forming a dovetail fixing, wherein the high-tensile band 14 is pinched between the dovetail contact flanks 121a and the corresponding surface of the fan disc.

However, it is pointed out that the connection of the retainer band 14 to the root portion 121 of the blade 12 may also be provided for in other manners. For example, the high-tensile band 14 could alternatively run through an appropriate opening in the fan disc 13 and be retained inside an inner disc bore instead. In such case, the band 14 would in a similar extend in the radial direction along the suction side 126 and along the pressure side 127 of the aerofoil portion to radially retain the blade 12 in case of a fan blade off.

In another alternative, the band 14 does not loop around the root portion 121, but is formed by two band elements, wherein one element extends radially at the pressure side 127 and one element extends radially at the suction side 126 of the blade, and wherein each of the elements is secured to the root portion 121 of the blade 12, e.g., by means of pins, hooks or other fastening means. However, even if the retention band 14 is looped around the root portion 121, reinforcing through thickness pinning or similar means could be applied to increase the retention strength if required.

The band 14 may be tapered towards the tip portion 123 of the blade 12, as already mentioned. Further, the thickness of the retention band 14 may decrease towards the tip portion 123. For example, the retention band 14 may have a thickness of 1 to 2 mm at the root portion 121 and may gradually become thinner towards the tip portion 123 to achieve a thickness of, e.g., about one half millimeter at the tip portion 123. Further, the retention band 124 may be thinner towards the leading edge 124 and towards the trailing edge 125 of the blade 12, as shown with respect to FIG. 3.

The retention band 14 may be made out of a material that is lower in weight than the material of which the aerofoil section 122 is made. In particular, the retention band 124 may be made out of Kevlar, in particular a woven Kevlar fabric.

In a further embodiment, pretention may be applied to the band 14. Such pretention is associated with two advantages. First, in case of a fan blade off event, pretention of the band 14 reduces any radial movement of fractured blade fragments and thus decreases rotor out of balance loads. Second, pretensioning the band 14 has the effect that the band 14 takes some of the steady state loading on the blade during normal operation of the blade and thus allows a reduction in load and weight of the normal load bearing material.

Figure 5:
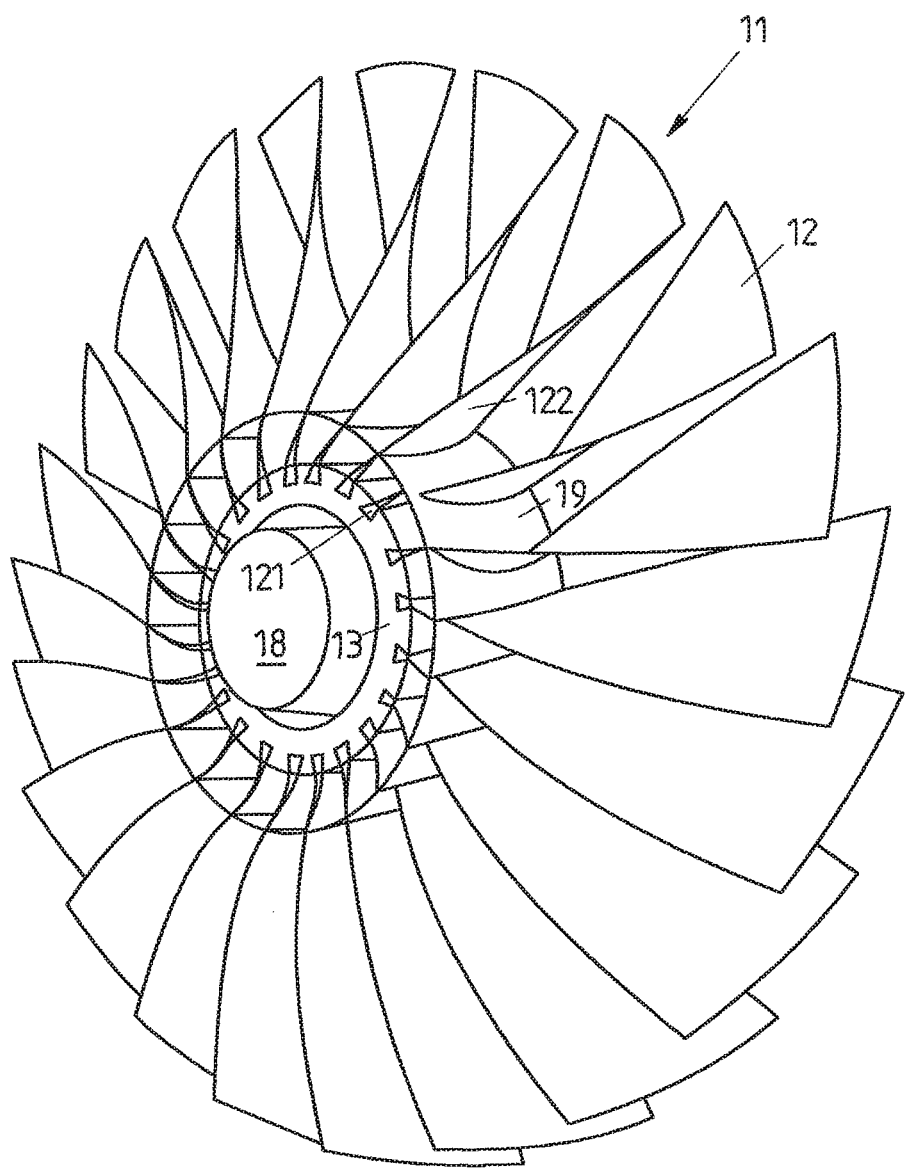
FIG. 5 is a perspective view of a fan blade.

FIG. 5 shows a fan 11 with blades 12 that include a retention structure in accordance with the present invention, the retention structure is not being shown in FIG. 5. The blades 12 are connected with their root portions 121 to a fan disc 13, as has been discussed before. There is also shown a central hub portion 18 of the fan. In the embodiment of FIG. 5, the fan 11 further includes a ring wall 19 which separates the root portion 121 from the aerofoil portion 122 which is used to accelerate the incoming air. However, such ring wall 19 is optional only.

Figure 6:
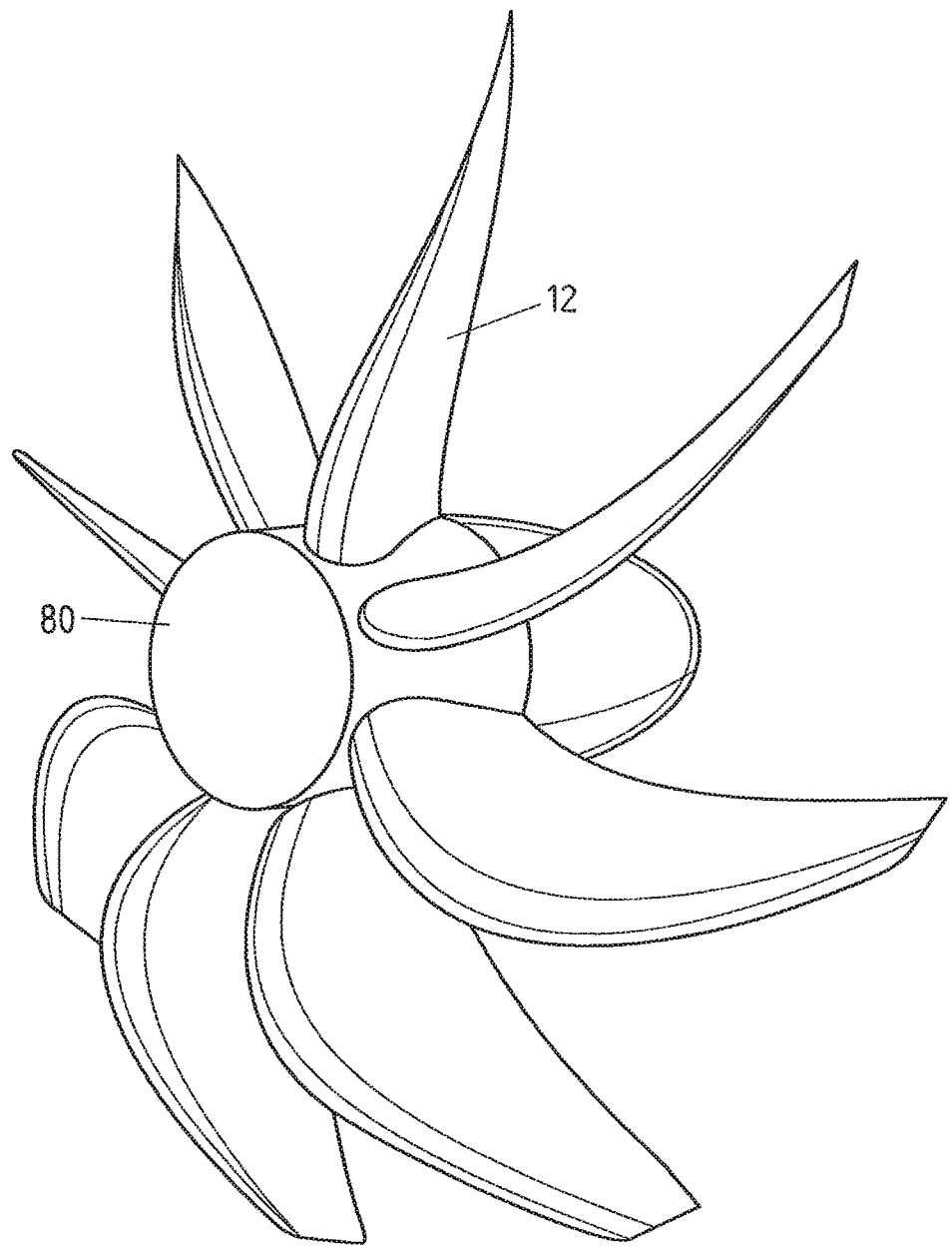
FIG. 6 is a perspective view of a propeller of a turbo-prop engine.

The principles of the present invention can be similarly applied to other blades, such as the blades of a propeller as shown in FIG. 6. The propeller of FIG. 6 may be the propeller of a turbo-prop engine and comprises a central hub portion 80 which is driven by the turbo-prop engine and from which radially extend a plurality of similarly shaped propeller blades 12 which are formed in accordance with the present invention.

It should be understood that the above description is intended for illustrative purposes only, and is not intended to limit the scope of the present disclosure in any way. In particular, the invention is not limited to the illustrated embodiments described above. For example, the retention structure that is configured to radially retain the blade in case of a structural blade failure may be formed in a different manner than described with respect to the Figures. For example, the retention structure could be formed by a plurality of parallel bands or ribbons instead of one band. Also, the retention structure may be made out of a different material than a textile. For example, the retention structure could alternatively be formed from a high-tensile plastic material. Thus, those skilled in the art will appreciate that other aspects of the disclosure can be obtained from a study of the drawings, the disclosure and the appended claims.

All methods described herein can be performed in any suitable order unless otherwise indicated herein or otherwise clearly contradicted by context. Various features of the various embodiments disclosed herein can be combined in different combinations to create new embodiments within the scope of the present disclosure. Any ranges given herein include any and all specific values within the range and any and all ranges within the given range.

The invention claimed is:

1. A blade arrangement of a jet engine or an aircraft propeller, comprising:
   a blade with a root portion and an airfoil portion, wherein the airfoil portion comprises a suction side, a pressure side and a blade tip,
   a retention structure for radially retaining the blade in case of a structural blade failure, wherein the retention structure:
   is secured to at least one chosen from the root portion and a structure adjacent to the root portion and extends in a radial direction along the suction side and along the pressure side of the airfoil portion,
   forms a loop that runs at least around the root portion, along the suction side and along the pressure side of the blade, and
   includes a textile band or ribbon that forms a full loop which runs around the root portion, along the suction side, along the pressure side and around the blade tip, wherein the band or ribbon runs around the blade tip by looping over the blade tip or by running through an opening formed in the blade tip.

2. The blade arrangement of claim 1, wherein the band or ribbon is attached to the root portion with a fastening device.

3. The blade arrangement of claim 1, wherein the band or ribbon is tapered towards the blade tip.

4. The blade arrangement of claim 1, wherein the band or ribbon is made out of a material that is lower in weight than a material out of which the airfoil portion is made.

5. The blade arrangement of claim 1, wherein the airfoil portion comprises on both the suction side and the pressure side at least one groove or indentation, wherein the band or ribbon is arranged in the at least one groove or indentation.

6. The blade arrangement of claim 5, wherein the retention structure is formed integrally with the blade.

7. The blade arrangement of claim 5, wherein the band or ribbon is pretensioned in the radial direction.

8. The blade arrangement of claim 1, wherein the blade is a jet engine fan blade or a jet engine propeller blade.

9. A jet engine comprising the blade arrangement of claim 1.

10. The blade arrangement of claim 1, wherein a thickness of the band or ribbon decreases towards the blade tip.

11. The blade arrangement of claim 5, and further comprising an adhesive joining the band or ribbon to the at least one groove or indentation.

12. The blade arrangement of claim 11, wherein a final shape of the blade includes a smooth aerodynamic external profile achieved by the band or ribbon being joined to the at least one groove or indentation with the adhesive.

13. The blade arrangement of claim 11, wherein the band or ribbon is tapered towards the blade tip.

14. The blade arrangement of claim 13, wherein the band or ribbon is made out of a material that is lower in weight than the material out of which the airfoil portion is made.

15. The blade arrangement of claim 11, wherein the band or ribbon is made out of a material that is lower in weight than the material out of which the airfoil portion is made.

16. The blade arrangement of claim 14, wherein the retention structure is formed integrally with the blade.

17. The blade arrangement of claim 16, wherein the band or ribbon is pretensioned in the radial direction.

18. The blade arrangement of claim 1, wherein the retention structure is formed integrally with the blade.

19. The blade arrangement of claim 1, wherein the band or ribbon is pretensioned in the radial direction.

20. The blade arrangement of claim 5, wherein a thickness of the band or ribbon decreases towards the blade tip.

\* \* \* \* \*